(12) United States Patent
Declerck et al.

(10) Patent No.: US 11,633,861 B2
(45) Date of Patent: Apr. 25, 2023

(54) SYSTEMS, METHODS AND ASSOCIATED COMPONENTS FOR ROBOTIC MANIPULATION OF PHYSICAL OBJECTS

(71) Applicant: CommScope Technologies LLC, Hickory, NC (US)

(72) Inventors: Thierry Mike Declerck, Kumtich (BE); Christiaan Radelet, Aarschot (BE); Rudy Musschebroeck, Wemmel (BE); Peter Merlo, Holsbeek (BE); Jozef Christiaan Mathieu Versleegers, Bree (BE); Jan Willem Rietveld, Benschop (NL); Michael Maris, Paal (BE)

(73) Assignee: CommScope Technologies LLC, Hickory, NC (US)

( * ) Notice: Subject to any disclaimer, the term of this patent is extended or adjusted under 35 U.S.C. 154(b) by 89 days.

(21) Appl. No.: 16/801,638

(22) Filed: Feb. 26, 2020

(65) Prior Publication Data
US 2020/0276714 A1 Sep. 3, 2020

Related U.S. Application Data

(60) Provisional application No. 62/812,406, filed on Mar. 1, 2019.

(51) Int. Cl.
*B25J 9/16* (2006.01)
*B25J 15/00* (2006.01)

(52) U.S. Cl.
CPC ........... *B25J 9/1697* (2013.01); *B25J 9/1612* (2013.01); *B25J 9/1664* (2013.01); *B25J 9/1669* (2013.01);
(Continued)

(58) Field of Classification Search
CPC ...... B25J 9/1612; B25J 9/1669; B25J 9/1697; B25J 9/1664; B25J 15/0009;
(Continued)

(56) References Cited

U.S. PATENT DOCUMENTS 4,613,942 A 9/1986 Chen
5,161,846 A * 11/1992 Yakou .................... B25J 9/1612
901/32
(Continued)

FOREIGN PATENT DOCUMENTS

CN 20140438166 A 8/2014
JP 2679490 B2 8/1997
(Continued)

OTHER PUBLICATIONS

TE Connectivity, Micro-Ma Tch Miniature Surface Mounting Device (SMD) Printed Circuit (PC) Board Connectors, Specification, Dec. 6, 2013, 9 pages.

*Primary Examiner* — Spencer D Patton
(74) *Attorney, Agent, or Firm* — Merchant & Gould P.C.

(57) ABSTRACT

Systems, methods, and associated components for robotic manipulation of physical objects. The physical objects include three-dimensional gripping features configured to be detected by an optics system and gripped by an end-effector of a robotic arm with sufficient gripping force to move the physical objects against the force of gravity. Sets of the physical objects can have different sizes and shapes and, in some examples, include identically constructed three-dimensional gripping features.

9 Claims, 11 Drawing Sheets

(52) U.S. Cl.
CPC . *B25J 15/0047* (2013.01); *G05B 2219/39484* (2013.01)

(58) Field of Classification Search
CPC ......... B25J 15/0028–0047; B25J 15/02–0293; B25J 15/0433; B25J 15/08–106; B25G 1/102; G05B 2219/37199; G05B 2219/39484; G05B 2219/40565; G05B 2219/39482; G05B 2219/39466; G05B 2219/39473; G05B 2219/39476; G05B 2219/39496; Y10S 483/902; B23Q 3/155–1552; B23Q 3/1554; B23Q 2003/155414–155446

See application file for complete search history.

(56) References Cited

U.S. PATENT DOCUMENTS

| | | | |
|---|---|---|---|
| 6,163,946 A | 12/2000 | Pryor | |
| 6,681,151 B1 | 1/2004 | Weinzimmer | |
| 8,056,949 B1 | 11/2011 | Shaker | |
| 2010/0068024 A1 | 3/2010 | Agens | |
| 2017/0173796 A1* | 6/2017 | Kim | G05D 1/0234 |
| 2018/0355718 A1* | 12/2018 | Jarventausta | E21B 19/08 |
| 2020/0081439 A1* | 3/2020 | Mukherjee | B25J 15/0047 |
| 2021/0178607 A1* | 6/2021 | Saadat | B25J 15/045 |

FOREIGN PATENT DOCUMENTS

| | | | | |
|---|---|---|---|---|
| JP | 5879704 B2 | 10/2012 | | |
| JP | 2015199155 A * | 11/2015 | ............ | B25J 9/1612 |
| WO | WO-2013157119 A1 * | 10/2013 | ............ | B25J 9/1612 |
| WO | 2018078479 A1 | 5/2018 | | |

\* cited by examiner

SYSTEMS, METHODS AND ASSOCIATED COMPONENTS FOR ROBOTIC MANIPULATION OF PHYSICAL OBJECTS

CROSS-REFERENCE TO RELATED APPLICATION

This application claims priority to U.S. Provisional Patent Application Ser. No. 62/812,406, entitled SYSTEMS, METHODS AND ASSOCIATED COMPONENTS FOR ROBOTIC MANIPULATION OF PHYSICAL OBJECTS filed on Mar. 1, 2019, the disclosure of which is hereby incorporated by reference in its entirety.

BACKGROUND

Robots are used in many industries and applications to handle objects and move them from one place to another. Despite being superior in speed and task repetition compared with their human counterparts, robots tend to exhibit significantly less sensitivity and fine touch than their human counterparts in identifying and handling of physical objects, particularly when a robot is tasked with handling objects of disparate shapes, locations, and/or orientations.

SUMMARY

In general terms the present disclosure is directed to improved systems and methods for handling physical objects with a robot, as well as improvements in the physical objects themselves.

Robots are used in many industries and applications to handle objects and move them from one place to another. The process can be referred to as "pick and place", whereby the robot picks up an object from a first location and places or deposits the object in a second location. For example, pick and place robots are used in warehouses and other product fulfillment centers where items are packaged for distribution. Pick and place robots are also used for assembling parts in the manufacture of products, such as automobiles, furniture, electronics, machinery, etc. Pick and place robots are also used in other applications, such as in laboratories (e.g., biotechnology and chemistry laboratories), for repair and retrieval operations where human access is difficult or dangerous (e.g., in space, underground, and under water), in medical settings (e.g., robotically performed or partially robotically performed surgery), etc. These examples are just a few of a vast number of applications and contexts in which robotic picking and placing is used or may be used in the future.

Features of the present disclosure can provide one or more advantages or improvements in robotic manipulation of physical objects. One such example advantage is the ability of the same robot to easily manipulate objects of different sizes and/or shapes. Another such example advantage is the ability to identify an appropriate portion of an object to robotically grip it for manipulation. Another such example advantage is the ability to determine an orientation of a physical object and the orientation of an appropriate gripping portion of the physical object relative to an end effector of a robot.

According to certain aspects of the present disclosure, a robotic manipulation system comprises: a robotic arm, the robotic arm including: an end effector configured to selectively grip a three-dimensional gripping feature of a physical object positioned in a three-dimensional reference space; and a plurality of actuators configured to cause the end effector to translate and rotate within the three-dimensional reference space; an optics system configured to locate the three-dimensional gripping feature relative to the three-dimensional reference space and provide position output of the three-dimensional gripping feature; and a controller configured to, based on the position output, control the actuators to: i) move the end effector such that the end effector is aligned with the three-dimensional gripping feature; and ii) grip the three-dimensional gripping feature with the end effector. In some examples, the end effector is configured to selectively grip the three-dimensional gripping feature at least by inserting the end effector in at least one cavity of the three-dimensional gripping feature, the controller being further configured to control the actuators to insert at least a portion of the end effector in the at least one cavity. In some examples, the end effector is configured to selectively grip the three-dimensional gripping feature at least by grasping a protrusion of the three-dimensional gripping feature, the controller being further configured to control the actuators to cause the end effector to grasp the protrusion.

According to further aspects of the present disclosure, a robotic manipulation system comprises: a plurality of physical objects, each of the physical objects including a three-dimensional gripping feature defining at least one cavity, the three-dimensional gripping features of all of the plurality of physical objects being structurally identical; a robotic arm, the robotic arm including: an end effector configured to selectively grip the three-dimensional gripping feature of any of the physical objects positioned in a three-dimensional reference space; a plurality of actuators configured to cause the end effector to translate and rotate within the three-dimensional reference space; an optics system configured to locate the three-dimensional gripping feature of any of the plurality of physical objects relative to the three-dimensional reference space and provide position output of the three-dimensional gripping feature of a selected one of the physical objects; and a controller configured to, based on the position output, control the actuators to: i) move the end effector such that the end effector is aligned with the three-dimensional gripping feature of the selected physical object; and ii) grip the three-dimensional gripping feature of the selected physical object with the end effector. In some examples, the end effector is configured to selectively grip the three-dimensional gripping feature of the corresponding physical object at least by inserting the end effector in at least one cavity of the three-dimensional gripping feature, the controller being further configured to control the actuators to insert at least a portion of the end effector in the at least one cavity of the corresponding physical object. In some examples, the end effector is configured to selectively grip the three-dimensional gripping feature at least by grasping a protrusion of the three-dimensional gripping feature of the corresponding physical object, the controller being further configured to control the actuators to cause the end effector to grasp the protrusion.

According to further aspects of the present disclosure, a physical object configured to be robotically manipulated, comprises a three-dimensional gripping feature, the three-dimensional gripping feature being configured to be located by an optics system and further adapted to be gripped by an end effector of a robotic arm.

According to further aspects of the present disclosure, a set of physical objects configured to be robotically manipulated is provided, where each of the physical objects comprises: a three-dimensional gripping feature defining at least one cavity, the three-dimensional gripping feature being configured to be located by an optics system and further configured to receive in the at least one cavity at least a portion of an end effector of a robotic arm, wherein the three-dimensional gripping features of all of the physical objects are identical; and wherein at least two of the physical objects have different physical shapes and/or sizes.

According to further aspects of the present disclosure, a set of physical objects configured to be robotically manipulated is provided, each of the physical objects comprising: a three-dimensional gripping feature, the three-dimensional gripping feature being configured to be located by an optics system and further configured to be gripped by an end effector of a robotic arm, wherein the three-dimensional gripping features of all of the physical objects are identical; and wherein at least two of the physical objects have different physical shapes and/or sizes.

According to still further aspects of the present disclosure, a method of gripping a physical object with an end effector of a robotic arm comprises: locating, with an optics system and relative to a three-dimensional reference space, a three-dimensional gripping feature of a physical object; gripping the three-dimensional gripping feature with the end effector; and moving, with the robotic arm, the physical object within the three-dimensional reference space.

As used herein, the term "three-dimensional gripping feature" refers to a gripping feature that has one or more surfaces that lie or partially lie in multiple non-coplanar reference planes. In non-limiting examples, a three-dimensional gripping feature in accordance with the present disclosure defines one or more of: a blind cavity that is recessed relative to a surface of a physical object; a through cavity that extends through a portion of a physical object; and/or a protrusion protruding from a surface of a physical object.

As used herein, the term "gripping" as applied to a three-dimensional gripping feature requires simultaneous gripping of at least two surface locations of the three-dimensional gripping feature, wherein the surface(s) of the three-dimensional gripping feature are defined by tangent planes, respectively, at the at least two surface locations, where those tangent planes are not coplanar. In some examples, the at least two surface locations are defined by one or more surfaces of: a blind cavity that is recessed relative to a surface of a physical object; a through cavity that extends through a portion of a physical object; and/or a protrusion protruding from a surface of a physical object.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1:
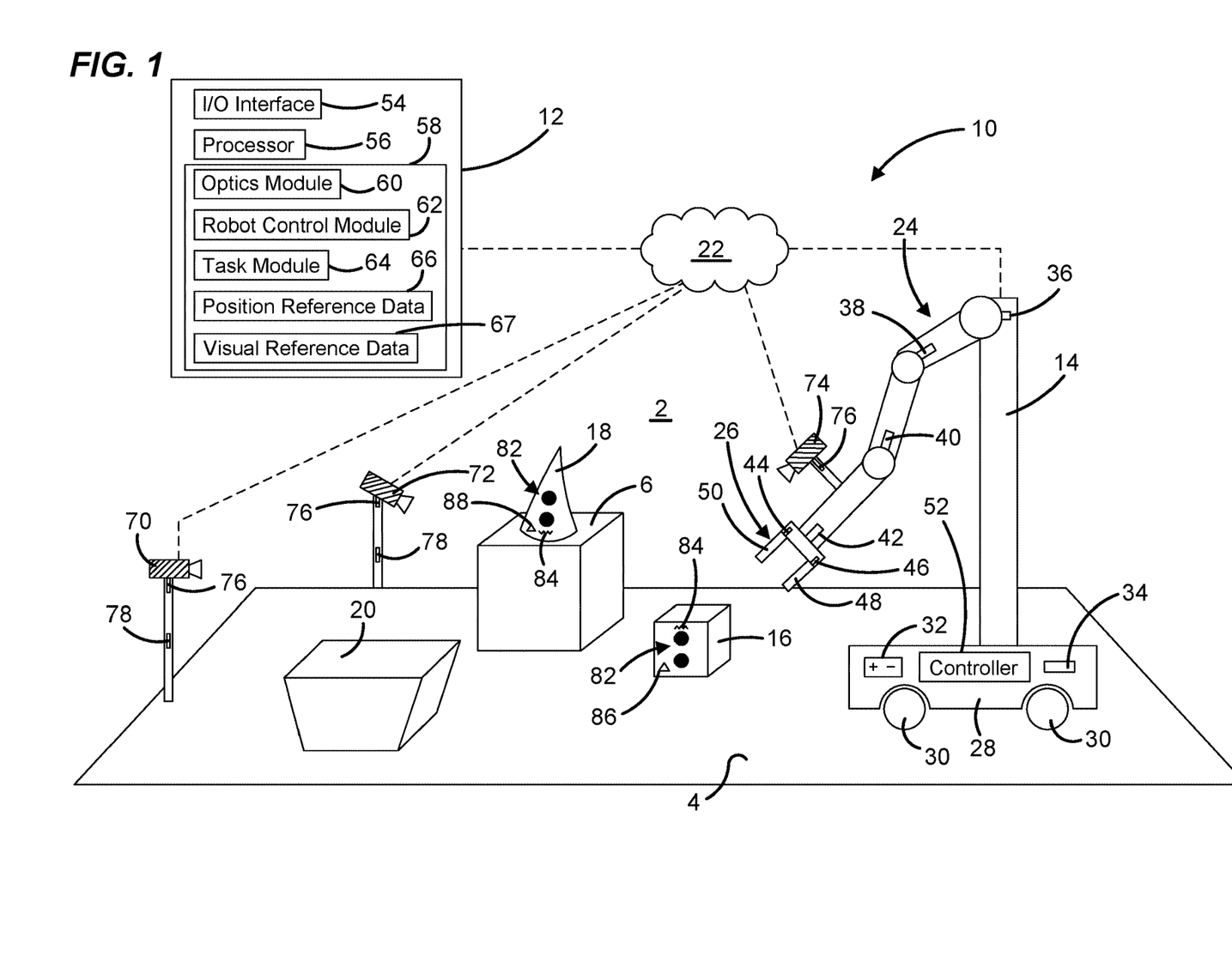
FIG. 1 is a schematic representation of an embodiment of a robotic manipulation system according to the present disclosure.

Referring to FIG. 1, a robotic manipulation system 10 includes an operating subsystem 12, a robot 14, and one or more physical objects 16, 18 that can be manipulated by the robot 14. Components of the operating subsystem 12 can be centralized in a single physical location (e.g., a single server or other computer device). Alternatively, the components of the operating system 12 can be divided amongst multiple computer devices that are operatively linked together. At least the robot 14 and the physical objects 16, 18 are positioned in a three-dimensional reference space 2. The three-dimensional reference space 2 includes one or more surfaces 4, 6. In the example system 10, the robot 14 and the physical object 16 are positioned on the surface 4, and the physical object 18 is positioned on the surface 6. Optionally, the physical surface 6 is itself directly or indirectly supported by the surface 4. Thus, it should be appreciated that three-dimensional objects in the reference space 2 can be positioned at different horizontal and vertical positions in a three-dimensional coordinate system defined by the physical space 2.

There can be any number of physical objects (such as the physical objects 14, 16) in the three-dimensional reference space 2. The robot 14 is configured to pick the objects in the three-dimensional reference space from one location and move them to another. For example, robot 14 picks the objects 14, and 16 and places them in a container 20 also positioned in the three-dimensional reference space 2. In other examples the robot 14 constructs an assembly by picking and placing the physical objects to assemble them together.

The robot 14 and the operating subsystem 12 are operatively linked, e.g., by one or more hard connections (e.g., electrical and/or optical cables) and/or are at least partially wirelessly linked via a network 22.

The robot 14 can have many configurations. In addition, multiple robots can be used for picking and placing in the same three-dimensional reference space 2. In the example schematic configuration of the robot 14, the robot 14 includes a chassis 28, a robotic arm 24, and an end effector 26 coupled to and extending from the robotic arm 24. A local or remote power source 32 (e.g., a battery, or a hard connection to an external power supply) provides power to the robot 14. The power generated by the power source 32 can be used to electrically power actuators, such as solenoids, to drive movement of components of the robot 14 (e.g., drive shafts, rotors, etc.), and or components of a hydraulic or pneumatic systems of the robot 14 (e.g. valves that regulate hydraulic flow to hydraulic cylinders).

The example robot 14 includes a conveyor. In this example the conveyor includes a powered wheel system operatively coupled to the chassis 28 and including a plurality of drivable and/or steerable wheels 30 to move the robot 14 within the three-dimensional reference space 2.

The robot includes a plurality of actuators. The actuators can be electrically and/or hydraulically and/or pneumatically driven. In the example shown, the robot 14 includes at least one actuator 34 that drives and/or steers the conveyor. The actuators 36, 38, and 40 provide force to the robotic arm 24 needed to cause the arm to articulate, translate, rotate or otherwise move in the three-dimensional reference space 2 relative to the chassis 28. The one or more actuators 42 provide force to rotate and/or change the attitude of the end effector 26 relative to the rest of the robotic arm 24. The actuators 44 and 46 provide force needed to articulate and/or rotate the fingers 48, 50 of the end effector 26 relative to rest of the end effector 26 in order to selectively grip or release a physical object with the end effector 26.

The robot 14 includes at least one controller 52. The at least one controller 52 is operatively linked (e.g., via the network 22) to the operating subsystem 12. Signals provided by the operating subsystem 12 are transmitted to the controller 52 and vice versa. The controller 52 outputs control signals to control movement of the robot 14, including, e.g., all of the robot's actuators. In addition the controller 52 can provide operational information about the robot 14 to the operating subsystem 12.

The operating subsystem 12 includes in input/output interface 54, one or more processors 56, and non-transitory storage 58 (e.g., one or more databases and/or other forms of non-transitory memory). The storage 58 has stored thereon computer-readable instructions. At least some of the computer-readable instructions can be organized as modules executable by the one or more processors 56 to perform certain functions. The storage 58 also stores data that can be read from and written to, such as look-up tables used by the one or more processors 56 in conjunction with the computer readable instructions.

The storage 58 includes an optics module 60, a robot control module 62, a task module 64, position reference data 66, and feature identification data, which will be described in more detail below.

The interface 54 receives input, e.g., from a human operator of the system 10, and provides output observable by the human operator relating to the system 10. The interface 54 can include one or more visual displays, one or more audio output devices (e.g., a speaker), one or more audio input devices (e.g., a microphone), and/or one or more other input devices (e.g., a touch-sensitive screen, a keyboard, a keypad, a moveable cursor, etc.). Thus, a human operator can interact with the system 10 via the interface 54.

The optics module 60 locates and orients pre-defined three-dimensional gripping features of physical objects 16, 18 positioned in the three-dimensional reference space 2. Such location and orientation data can be used by the robot control module 62 such that signals are sent to the controller 52 that cause the robot 14 to grip the located three-dimensional gripping feature and move the corresponding physical object to a desired location.

The optics module 60 uses visual information provided by one or more optical detectors 70, 72, 74, e.g., cameras. The number and position of optical detectors within the three-dimensional reference space 2 can be selected to optimize visual mapping of the three-dimensional reference space 2 such that three-dimensional gripping features of physical objects in the three-dimensional reference space can be precisely located within the three-dimensional reference space.

It should be appreciated that other forms of detectors known now or in the future for mapping the presence of solid structures (e.g., detectors that use radar, sonar, infrared, etc.), in addition to, or as an alternative to, visual detectors, can be used to locate and/or orientate three-dimensional gripping features of physical objects in accordance with the present disclosure.

Optionally, one or more of the optical detectors includes one or more actuators 76 for moving the detector relative to the three-dimensional reference space 2 and thereby capture additional fields of view. In some examples, a controller 78 dedicated to one or more of the optical detectors provides the control signals to the corresponding actuator 76. The controller 78, in turn, can receive command signals from the operating subsystem 12. Optionally, at least one of the optical detectors 74 is physically coupled to the robot 14. The optical detector 74 is physically coupled to the robot 14 in a predefined position relative to the end effector 26. Thus, visual feedback from the optical detector 74 can be used by the operating subsystem 12 to locate the end effector relative to the three-dimensional reference space 2.

The optical detectors 70, 72, 74 and the optics module 60 together form an optics system 80 (FIG. 2) of the system 10 (FIG. 1). The optics system 80 functions to visually locate and orientate three-dimensional gripping features of physical objects in the three-dimensional reference space 2. For example, captured visual information is compared to feature identification data to determine if a three-dimensional gripping feature has been detected, where that three-dimensional gripping feature is positioned, and how it is oriented.

Figure 2:
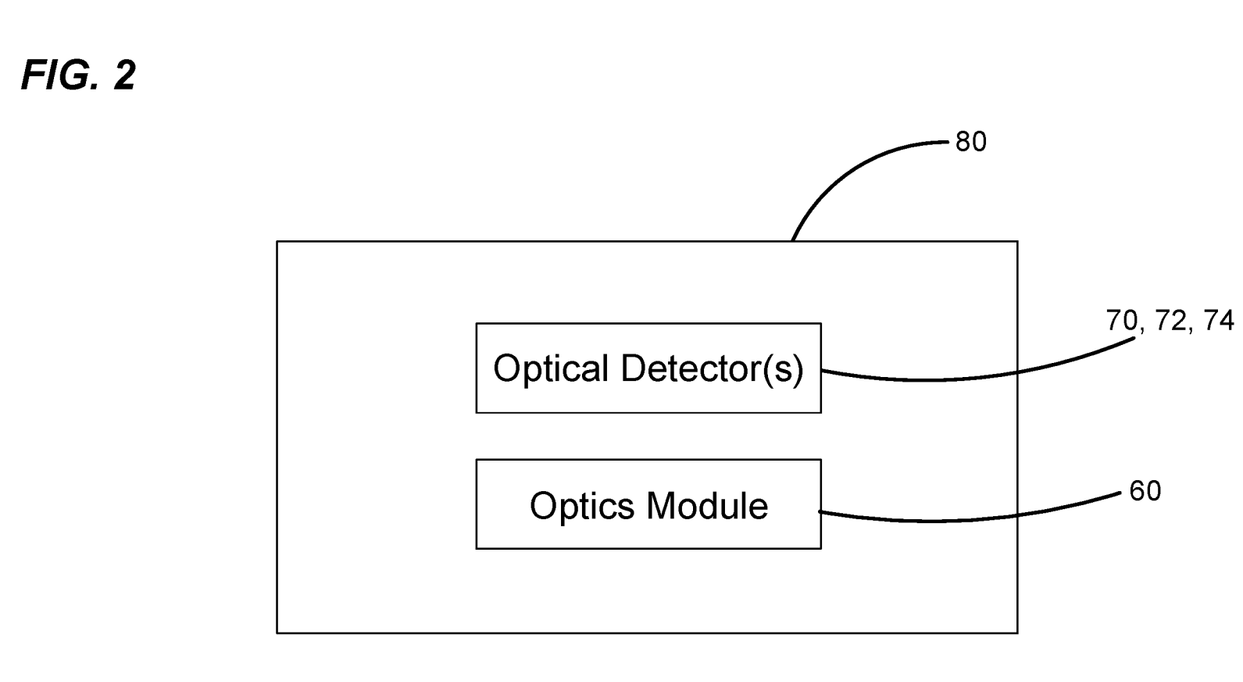
FIG. 2 is a schematic representation of the optics system of the robotic manipulation system of FIG. 1

Visual reference data 67 can include visual information of known physical features the optics system 80 can encounter in the three-dimensional reference space 2, such as fixed objects or landmarks that do not move relative to the three-dimensional reference space, as well as preset three-dimensional gripping features of physical objects that are picked and placed by the robot. There can be one or more than one (e.g., two, three, four, five, or more) different three-dimensional gripping feature configurations stored as discrete visual configurations in the feature identification data. Thus, using visual reference data 67, the optics system 80 is able to visually identify three-dimensional gripping features in the three-dimensional reference space 2.

The physical objects can include one or multiple differently configured three-dimensional gripping features, e.g., a single physical object can include multiple differently configured three-dimensional gripping features. The same end effector or differently configured end effectors can be used to grip differently configured three-dimensional gripping features. Thus, in some examples, the end effector can be swapped for (i.e., interchangeable with) another end effector. Physical objects within a given reference space can have the same or different three-dimensional gripping features as one another.

Identified visual features can also be located and orientated within the three-dimensional reference space 2 using position reference data 66. For example, referring to FIG. 1, captured visual information can include both a three-dimensional gripping feature 82 and a fixed physical feature. The location of the fixed physical feature is looked up in the position reference data 66 and the position of the three-dimensional gripping feature 82 is thereby derived. In addition, an orientation of the gripping feature 82 can be determined from the position of an orientation marker 84 associated with the gripping feature 82 relative to the gripping feature 82 within the captured visual. In some examples, the orientation marker is positioned on, or is an integrated feature of, the three-dimensional gripping feature. In other examples, the orientation marker is not positioned on, and is not an integrated feature of, the three-dimensional gripping feature.

In addition to the one or more optical detectors 74, additional sensors can be coupled at one or more positions to the robot 14 and/or the robotic arm 24. For example, one or more accelerometers with output linked to the operating subsystem 12 can provide orientation information of one or more components of the robot 14 relative to the force of gravity when the robot is known to be stationary. Thus, using the optics system 80, the position reference data 66, the visual reference data 67 and, optionally, additional location or orientation sensors of the robot 14, the location and orientation of a three-dimensional gripping feature 82 relative to both the three-dimensional reference space 2 and the end effector 26 can be determined. In the example shown, the three-dimensional gripping features 82 of the two differently shaped and sized physical objects 16, 18 are of identical construction. In other examples, the three-dimensional gripping features of different physical objects are not of identical construction.

In some examples, visual reference data 67 also includes pre-set visual information of the physical objects 16, 18 themselves. Thus, the optics system 80 can identify a physical object to be picked and placed without locating its three-dimensional gripping feature. In this scenario, if the physical object is identified but its three-dimensional gripping feature cannot be found in the visual information provided by the optics system, in some examples, the optics module 60 determines that the particular three-dimensional gripping feature is not accessible (e.g., because it is obscured or abutting another object or structure), and the optics module 60 therefore initiates a prompt for the robot 14 to, e.g., push or roll the physical object, or to cause the corresponding surface 4, 6 to vibrate until the gripping feature of that object becomes visible to the optics system 80 and accessible to the end effector 26.

The robot control module 62 receives location and orientation information from the optics system 80 and causes control signals to be provided to the controller 52 to control the robot to position itself whereby its end effector 26 can push or roll, or grip and place, the selected physical object. Thus, the robot control module 62 causes control signals to be provided to the controller 52 that move the chassis 28, and move the arm 24 such that the fingers 48, 50 of the end effector 26 are first aligned with, and then grip, the three-dimensional gripping feature 82 (e.g., by insertion into cavities of the three-dimensional gripping feature and then squeezing surfaces defining those cavities, or grasping a protrusion of the three-dimensional gripping feature), of the selected physical object 16, 18. Once gripped, the robot control module 62 causes control signals to be provided to the controller 52 that move the robot to a position where it can place the gripped object in the desired location (e.g., the container 20). Once the robot is in the proper position, the robot control module 62 causes control signals to be provided to the controller 52 to release the grip of the three-dimensional gripping feature 82 by the end effector 26, such that the physical object 16, 18 is placed in the desired location.

The task module 64 sets tasks to be performed by the robot 14. The tasks and order of the tasks can be preset and/or overridden by user input via the interface 54. For example, heavier objects may need to be placed in the container 20 before lighter objects. In another example, the task module 64 causes the robot 14 to perform manipulation operations on multiple objects in the most efficient manner possible, e.g., to minimize the amount of time needed to complete the desired picking and placing of every physical object.

In a particular example, the task module 64 causes the robot 14 (via the robot control module 62 and the controller 52) to pick and place the object 18 before picking and placing the object 16. In some examples, the objects 16, 18 can include unique visual object identifiers 86, 88 (e.g., scannable patterns or codes). Visual information for the unique object identifiers 86, 88, as well as any metadata (e.g., weight, dimensions, materials, etc.) for the object that can be linked to the object identifiers 86, 88, can be stored in visual reference data 67 and referred to by the optics system 80 and/or the task module 64, such that it can be determined if the appropriate physical object has been visually located for the next gripping operation by the robot 14 and what certain physical parameters of that object are. If visual information provided by the optics system 80 does not include the desired physical object, the task module can cause the optics system 80 to capture additional visuals within the three-dimensional reference space 2 until the desired object is identified. In some examples, the visual object identifier is positioned on, or is an integrated feature of, the three-dimensional gripping feature. In other examples, the visual object identifier is not positioned on, and is not an integrated feature of, the three-dimensional gripping feature.

Figure 3:
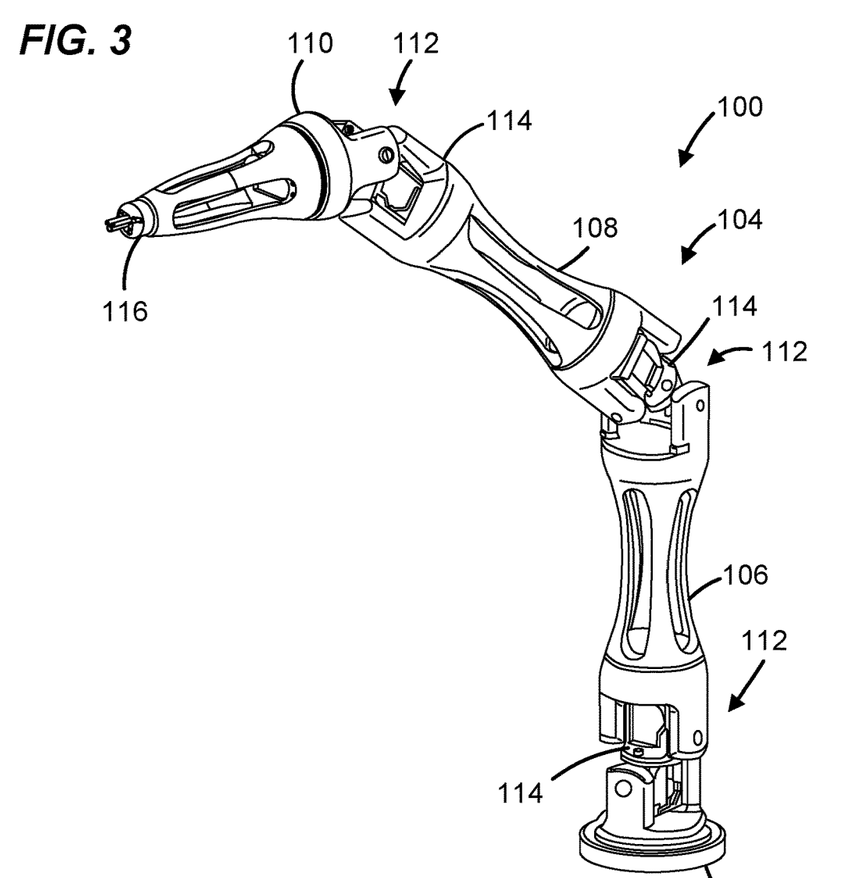
FIG. 3 depicts a robot that can be used in robotic manipulation systems according to the present disclosure.
Figure 4:
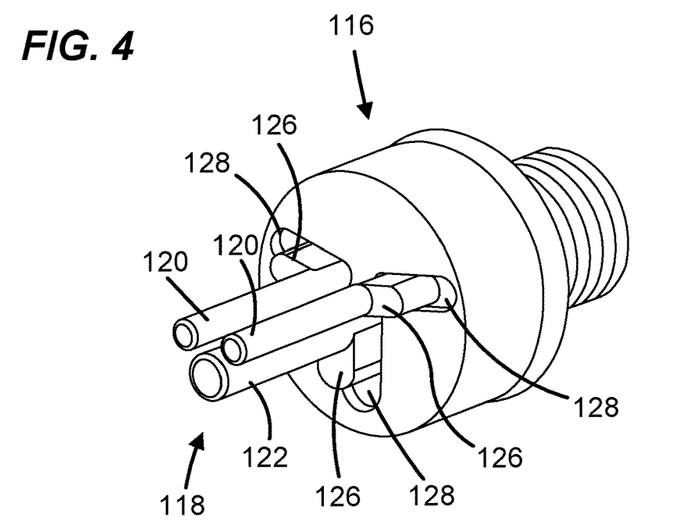
FIG. 4 is a portion of the robot of FIG. 3, including an end-effector.

Referring now to FIGS. 3-4, an example robot 100 that can be used in robotic manipulation systems, such as the system 10 just described, is depicted. The robot 100 includes a base 102 that, e.g., can be fixed (e.g., fastened) relative to a three-dimensional reference space in which the robot 100 is working. The robot 100 includes a robotic arm 104 extending from the base 102. The robotic arm 104 includes a plurality of segments 106, 108, 110 connected by joints 112 to each other and the base 102. The joints 112 can be independently moved with actuators 114. An end of the segment 110 is adapted to receive an end effector. In some examples, different end effectors can be mounted to the same segment 110. An example end effector 116 is depicted in FIGS. 3-4 that can be mounted to the segment 110. The end effector 116 includes an arrangement 118 of three fingers, including two fingers 120 of a first size and a third finger 122 of a second size that is larger than the first size. The fingers 120, 122 include bases 126 that can be moved (e.g., by one or more actuators) in slots 128 to provide insertion, gripping, and/or releasing configurations of the end effector 116 with respect to a three-dimensional gripping feature of an object positioned in the three-dimensional reference space. For example, the fingers 120, 122 can be moved apart from one another or brought together to provide a needed gripping or release of a three-dimensional gripping feature.

Figure 5:
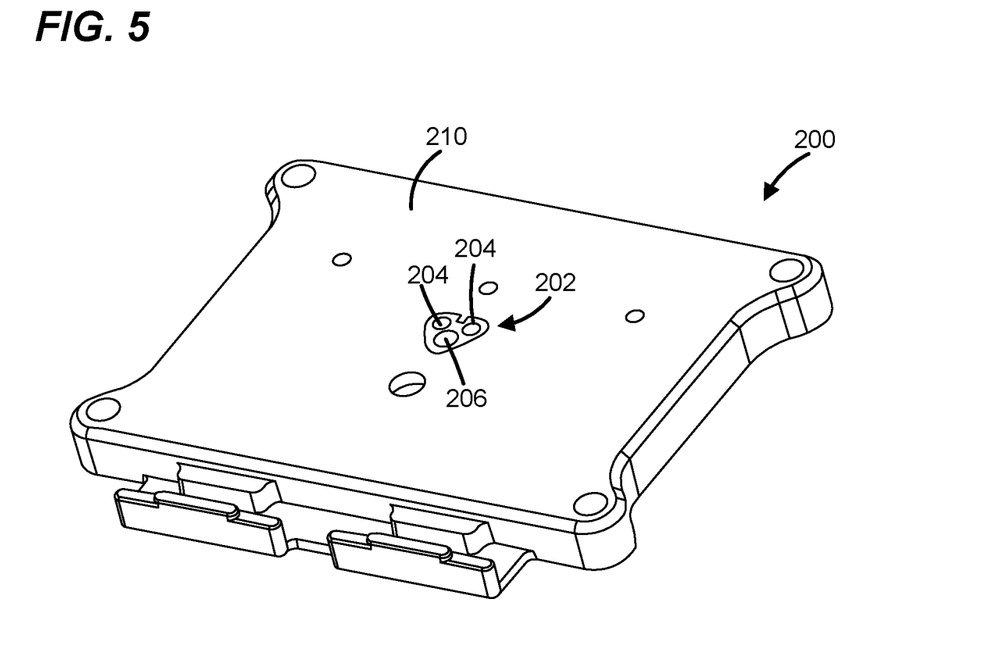
FIG. 5 is a perspective view of an embodiment of a physical object configured to be gripped by the end-effector of FIG. 4.
Figure 6:
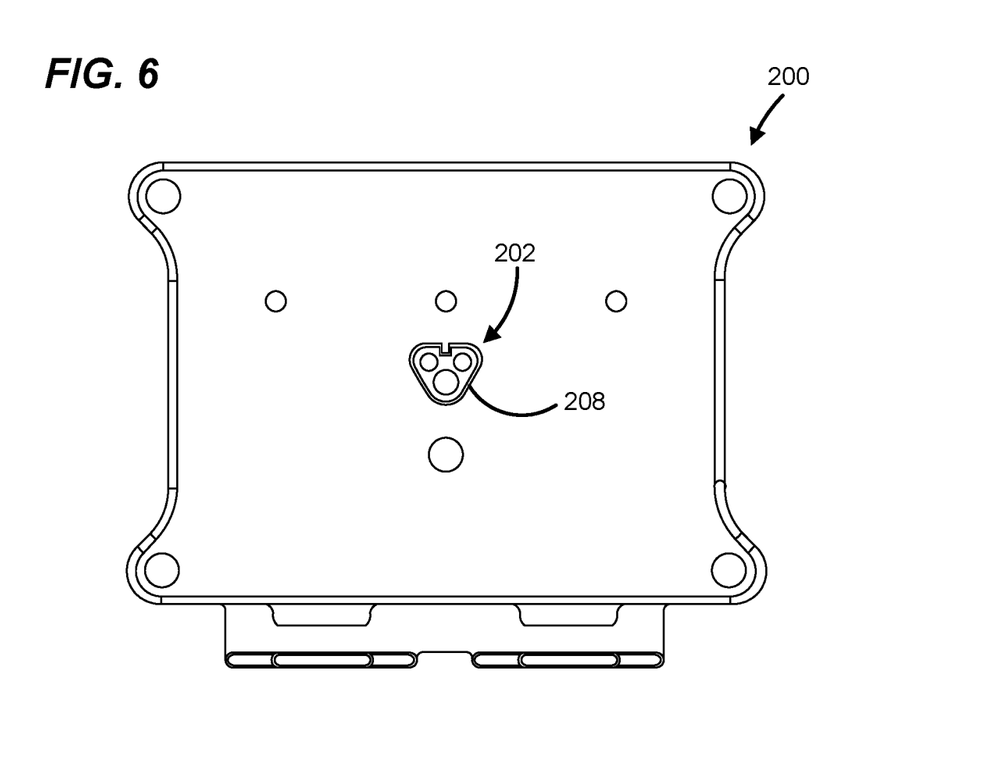
FIG. 6 is a top view of the physical object of FIG. 5.

Referring now to FIGS. 5-6, an example three-dimensional object 200 includes a three-dimensional gripping feature 202 that is configured to cooperate with the end effector 116 of FIGS. 3-4 such that the robot 100 (FIG. 3) can pick and place the object 200. The three-dimensional gripping feature includes an arrangement of cavities including two cavities 204 of a first size and a third cavity 206 of a second size that is larger than the first size. The cavities 204 are sized to receive the fingers 120 (FIG. 4) along an insertion direction (into the page in FIG. 6) with minimal space between the wall of the cavities and the fingers 120, and the cavity 206 is sized to receive the finger 122 (FIG. 4) with minimal space between the wall of the cavity and the finger 122. The cavities 204 are too small to receive the finger 122. Once the arrangement 118 of fingers (FIG. 4) is inserted into the corresponding cavities 204, 206, the fingers can be moved outward or inward to grip surfaces that define the cavities 204, 206. In this manner, the object 200 can be picked. To place the object 200, the fingers can be moved back to (or towards) their insertion configuration to thereby release the grip of the object 200. One or more of the cavities 204, 206 can be blind cavities and/or one or more of the cavities 204, 206 can define through holes. It should be appreciated that the cavities 204, 206 are recessed from a surface 210 of the object 200. In other examples, the gripping feature includes a protrusion that protrudes from a surface of the object. Optionally, the gripping feature 202 can have associated therewith a marker 208 which, in some examples, is positioned on, or integrated with, the gripping feature. The marker 208 can be used to orient the gripping feature 202 and/or link to information (e.g., metadata) about the object 200. In this example the marker 208 is a groove (i.e., is three-dimensional) that can optionally provide an additional gripping surfaces for an end effector that has a complementary gripping feature.

Figure 7:
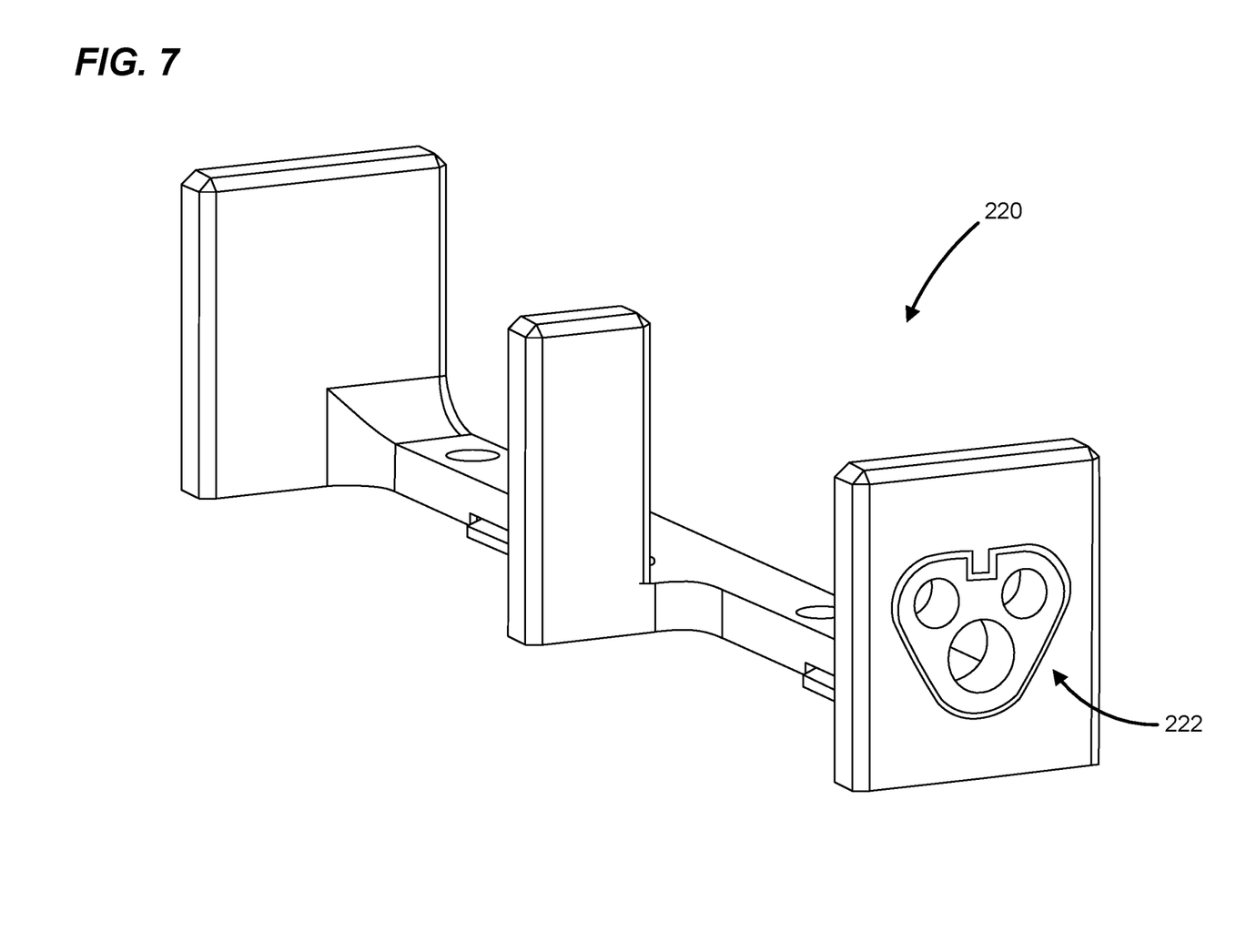
FIG. 7 is a perspective view of a further embodiment of a physical object configured to be gripped by the end-effector of FIG. 4.

Referring now to FIG. 7, a further example three-dimensional object 220 has one or more different characteristics as compared with the object 200 just described, such as one or more of its size, shape, weight, material composition, etc. The object 220 includes a three-dimensional gripping feature 222 that is identical to the three-dimensional gripping feature 202 just described, except that the cavities of the feature 222 define through holes, whereas the cavities of the gripping feature 202 are blind. Like the gripping feature 202, the gripping feature 222 is configured to be grippingly held by the finger arrangement 118 of the end effector 116 (FIG. 4).

Figure 8:
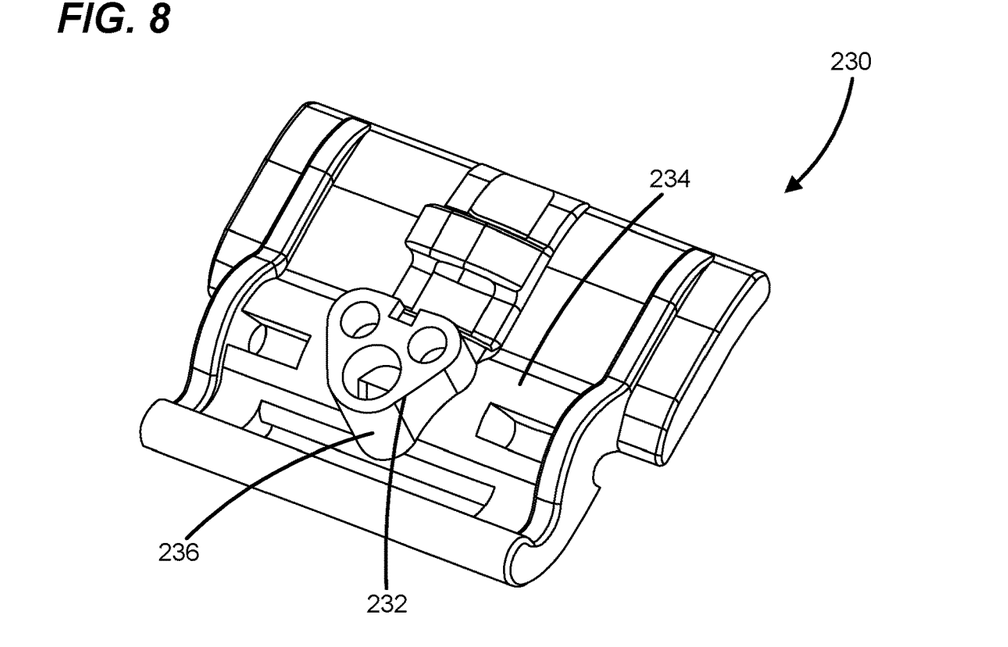
FIG. 8 is a perspective view of a further embodiment of a physical object configured to be gripped by the end-effector of FIG. 4.
Figure 9:
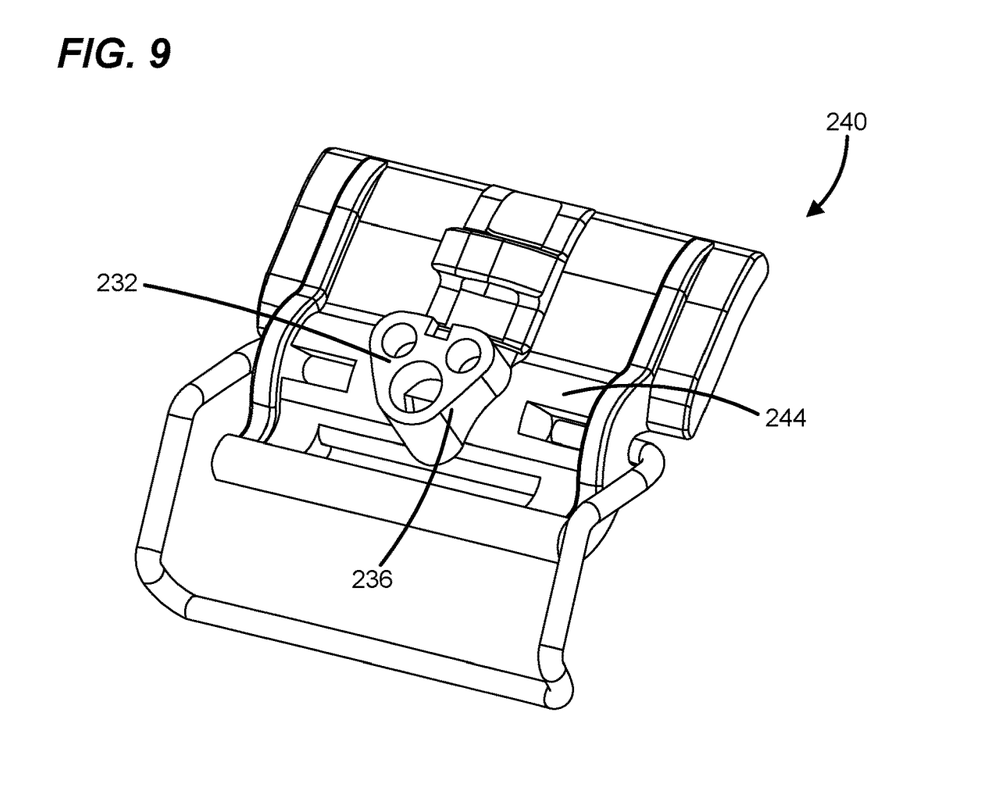
FIG. 9 is a perspective view of a further embodiment of a physical object configured to be gripped by the end-effector of FIG. 4.

Referring now to FIGS. 8-9, further example three-dimensional physical objects 230, 240 have one or more different characteristics as compared with each other and with the objects 200, 220 just described such as one or more of their size, shape, weight, material composition, etc. The objects 230, 240 have identical three-dimensional gripping features 232. Like the gripping features 202 and 222 described above, the gripping feature 232 is configured to be grippingly held by the finger arrangement 118 of the end effector 116 (FIG. 4). In addition to including cavities that can receive the fingers of the end effector 116, the gripping feature 232 protrudes from a surface 234, 244 of the object 230, 240, the protrusion defining an exterior surface 236 of the gripping feature 232. In some examples, the surface 236 can provide one or more additional gripping locations for a complementarily configured end effector.

Figure 10:
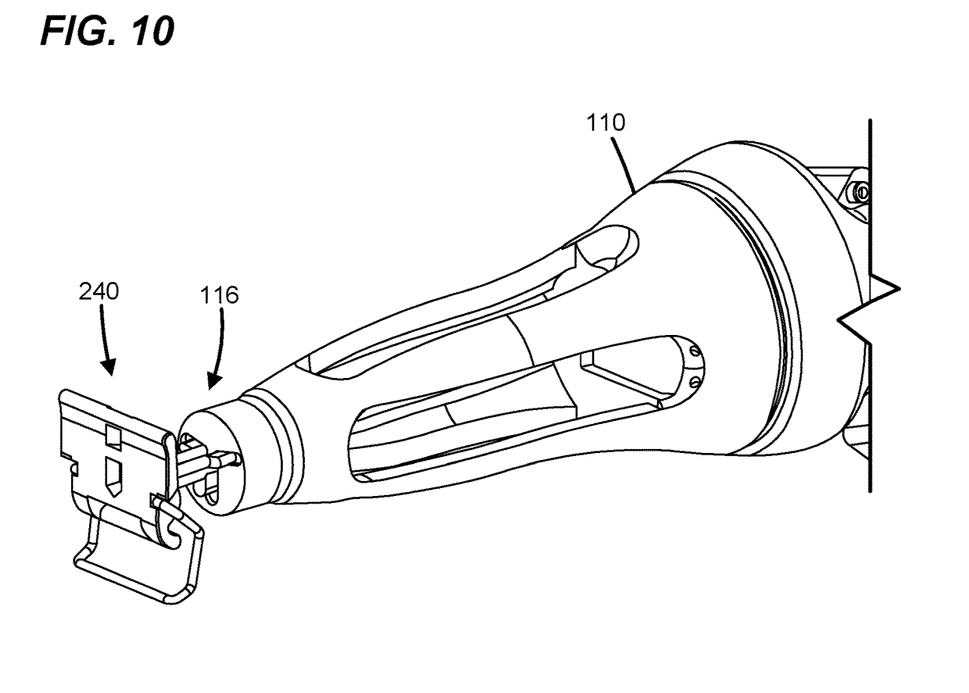
FIG. 10 is a perspective view illustrating a gripping of the physical object of FIG. 9 by the robot of FIG. 3.
Figure 11:
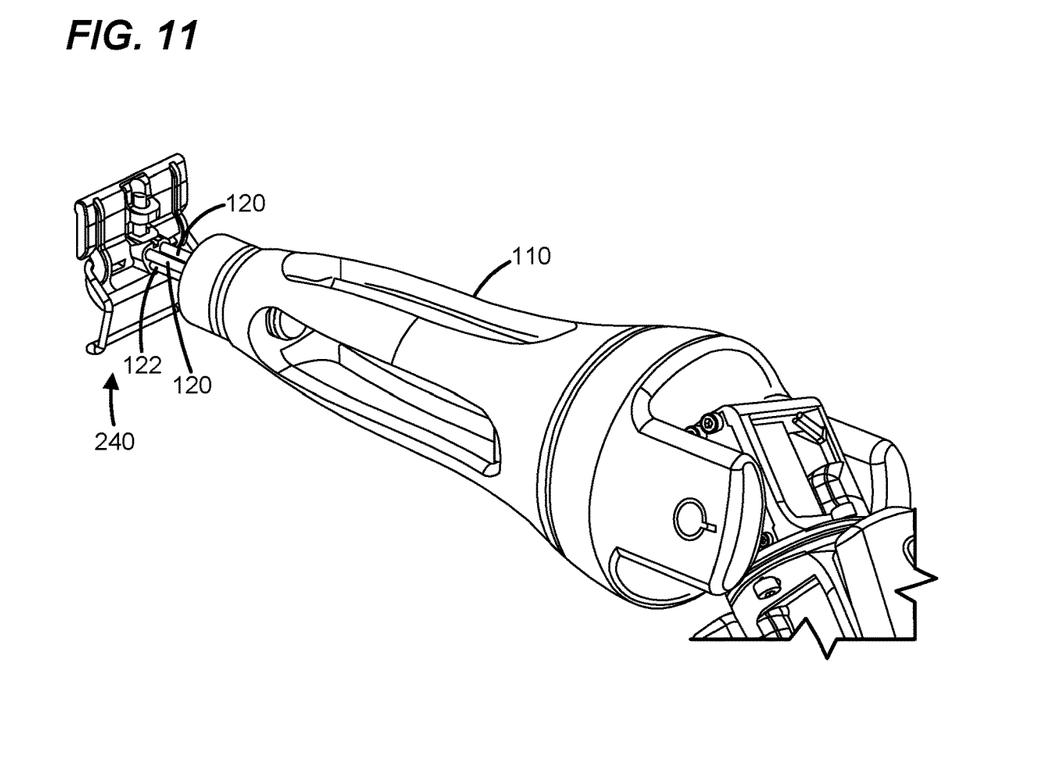
FIG. 11 is a further perspective view illustrating a gripping of the physical object of FIG. 9 by the robot of FIG. 3.
Figure 12:
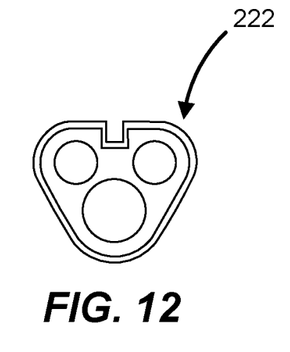
FIG. 12 is a schematic end view of an embodiment of a three-dimensional gripping feature of a physical object in accordance with the present disclosure.
Figure 13:
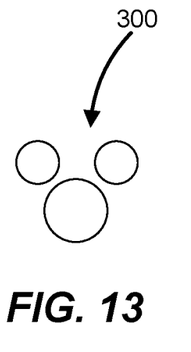
FIG. 13 is a schematic end view of a further embodiment of a three-dimensional gripping feature of a physical object in accordance with the present disclosure.
Figure 14:
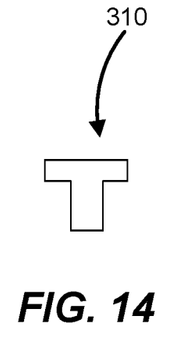
FIG. 14 is a schematic end view of a further embodiment of a three-dimensional gripping feature of a physical object in accordance with the present disclosure.
Figure 15:
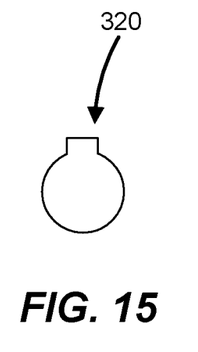
FIG. 15 is a schematic end view of a further embodiment of a three-dimensional gripping feature of a physical object in accordance with the present disclosure.

Referring now to FIGS. 10-11, the object 240 is shown being gripped by the end effector 116, the fingers of the end effector 116 having been inserted in the cavities of the gripping feature of the object 240.

Referring now to FIGS. 12-15, end views of four different three-dimensional gripping features are depicted, including the gripping feature 222 described above, and gripping features 300, 310 (T-shaped profiled) and 320 (key hole). In each of these embodiments a robot end effector can be inserted in an insertion direction into the page in order to engage and then grip the three-dimensional gripping feature.

Figures 16, 17:
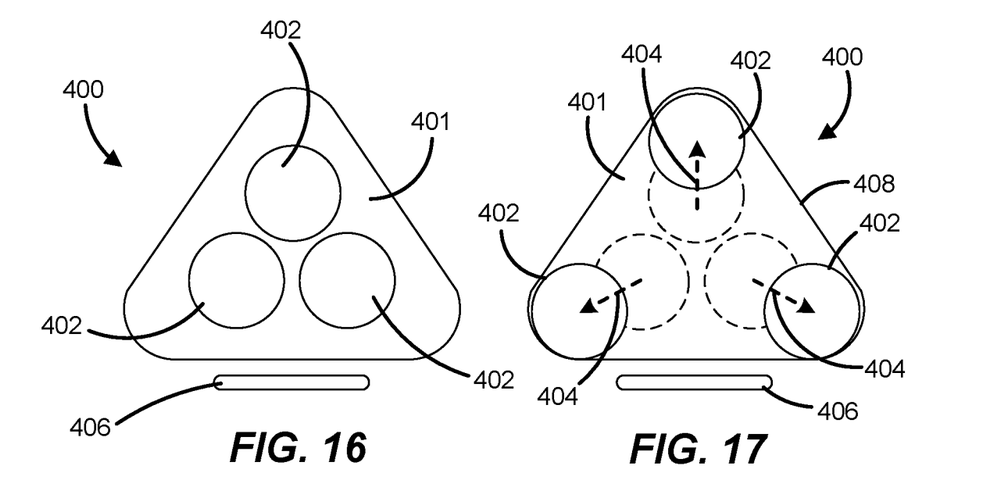
FIG. 16 is a schematic representation of an embodiment of an end-effector in a first position within an embodiment of a three-dimensional gripping feature of a physical object in accordance with the present disclosure.
FIG. 17 is a schematic representation of the end-effector of FIG. 16 in a second position within the three-dimensional gripping feature of FIG. 16.

Referring now to FIGS. 16-17, end views of a three-dimensional gripping feature 400 that defines a cavity 401 extending into the page are depicted. Thus, in this example, the gripping feature includes just a single cavity. Fingers 402 of an end effector can be inserted (in a direction into the page) into the cavity in a configuration shown in FIG. 16. Then, to grip the gripping feature 400, the fingers 402 are separated along the directions 404 as shown in FIG. 17 where they can grip the surface 408 that defines the cavity at multiple locations on that surface. In addition, an orientation marker 406 is associated with the gripping feature 400 such that one side of the gripping feature 400 is distinguishable from another side. The orientation marker 406 can be detected by an optics system such that the object associated with the gripping feature 420 can thereby be oriented with respect to a three-dimensional reference space.

Figure 18:
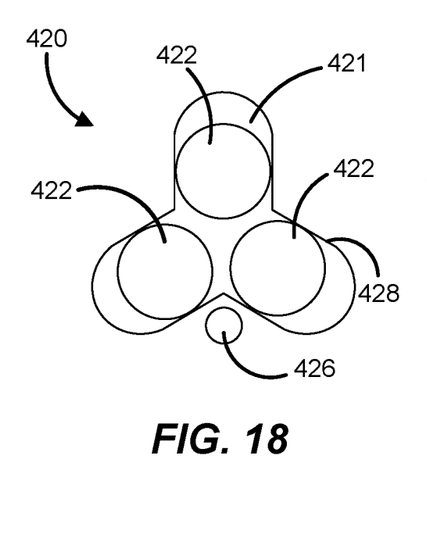
FIG. 18 is a schematic representation of the end-effector of FIG. 16 in a first position within a further embodiment of a three-dimensional gripping feature of a physical object in accordance with the present disclosure.
Figure 19:
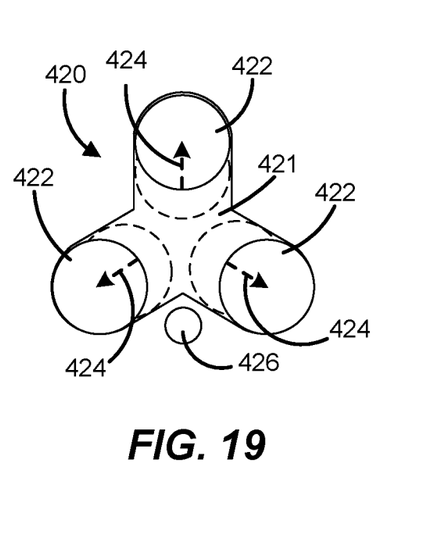
FIG. 19 is a schematic representation of the end-effector of FIG. 18 in a second position within the three-dimensional gripping feature of FIG. 18.

Referring now to FIGS. 18-19, end views of a further three-dimensional gripping feature 420 that defines a cavity 421 extending into the page are depicted. Thus, in this example, the gripping feature includes just a single cavity. Fingers 422 of an end effector can be inserted (in a direction into the page) into the cavity in a configuration shown in FIG. 18. Then, to grip the gripping feature 420, the fingers 422 are separated along the directions 424 as shown in FIG. 19 where they can grip the surface 428 that defines the cavity at multiple locations on that surface. In addition, an orientation marker 426 is associated with the gripping feature 420 such that one side of the gripping feature 420 is distinguishable from another side. The orientation marker 426 can be detected by an optics system such that the object associated with the gripping feature 420 can thereby be oriented with respect to a three-dimensional reference space.

Figure 20:
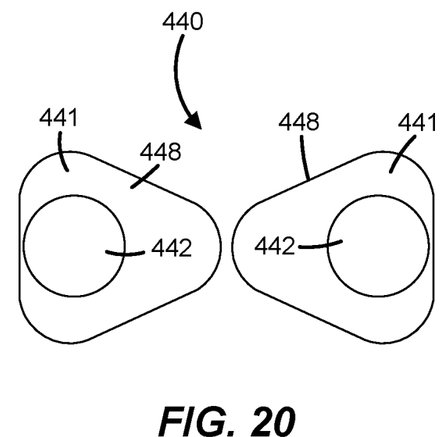
FIG. 20 is a schematic representation of a further embodiment of an end-effector in a first position within a further embodiment of a three-dimensional gripping feature of a physical object in accordance with the present disclosure.
Figure 21:
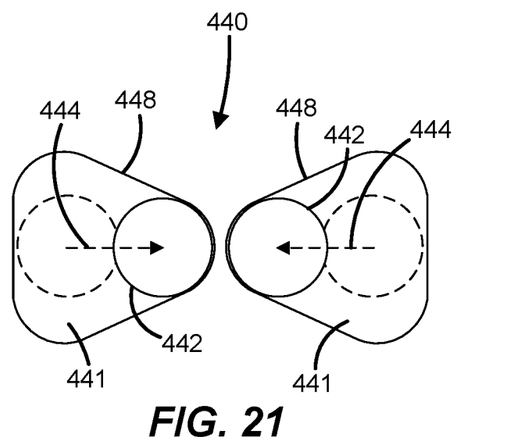
FIG. 21 is a schematic representation of the end-effector of FIG. 20 in a second position within the three-dimensional gripping feature of FIG. 20.

Referring now to FIGS. 20-21, end views of a further three-dimensional gripping feature 440 that defines a pair of cavities 441 extending into the page are depicted. Fingers 442 of an end effector can be inserted (in a direction into the page) into the cavities 441 in a configuration shown in FIG. 20. Then, to grip the gripping feature 440, the fingers 442 are brought towards each other along the directions 444 as shown in FIG. 21 where they can grip tapered portions of the cavities 441 at surfaces 448 that define the cavities. Optionally, an orientation marker associated with the gripping feature 440 can be provided as well.

Figure 22:
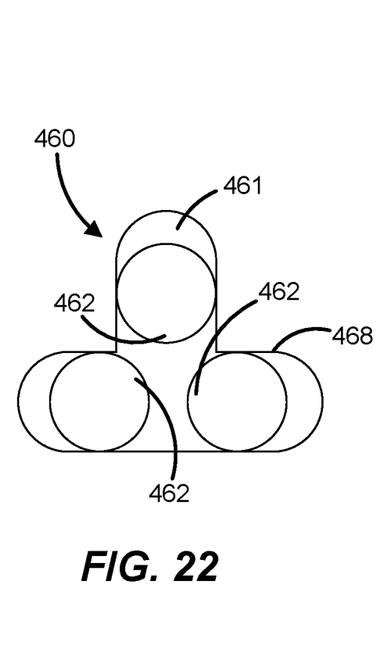
FIG. 22 is a schematic representation of a further embodiment of an end-effector in a first position within a further embodiment of a three-dimensional gripping feature of a physical object in accordance with the present disclosure.
Figure 23:
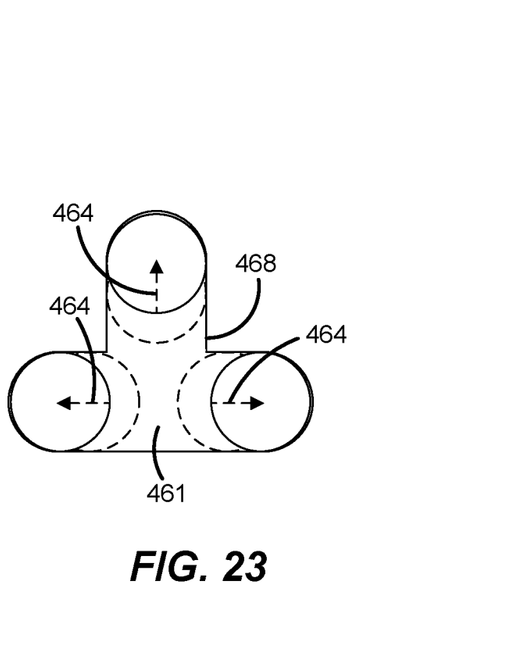
FIG. 23 is a schematic representation of the end-effector of FIG. 22 in a second position within the three-dimensional gripping feature of FIG. 22.
Figure 24:
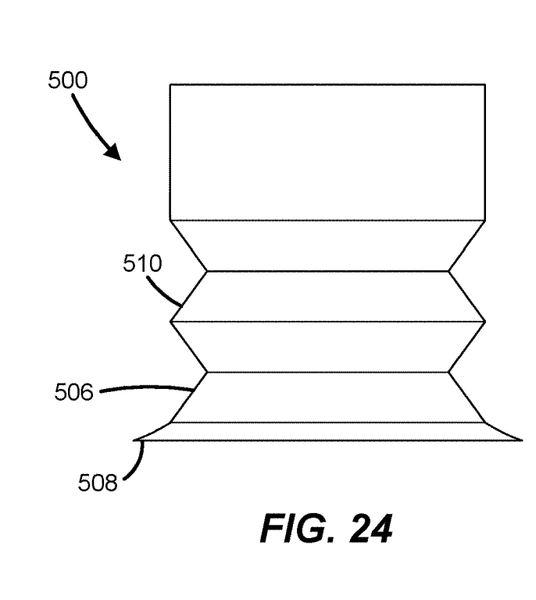
FIG. 24 is a side schematic view of a further embodiment of an end effector in accordance with the present disclosure, the end effector being in a first configuration.

Referring now to FIGS. 22-23, end views of a further three-dimensional gripping feature 460 that defines a single cavity 461 extending into the page are depicted. Fingers 462 of an end effector can be inserted (in a direction into the page) into the cavities 461 in a configuration shown in FIG. 22. Then, to grip the gripping feature 460, the fingers 462 are moved away from each other along the directions 464 as shown in FIG. 24 where they can grip the surface 468 that defines the cavity 461 at multiple locations. Due to the asymmetry of the cavity 461, a separate orientation marker is not associated with the gripping feature 460, i.e., the shape of the cavity 461 is self-orienting.

It should be appreciated that three-dimensional physical objects can be configured to include any of the three-dimensional gripping features disclosed herein, including the three-dimensional gripping features of FIGS. 12-23 as well as other configurations.

Figure 25:
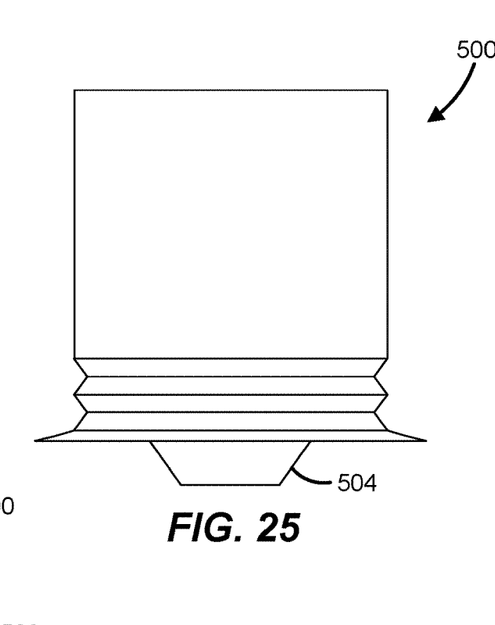
FIG. 25 is a side schematic view of the end effector of FIG. 24 in a second configuration.
Figure 26:
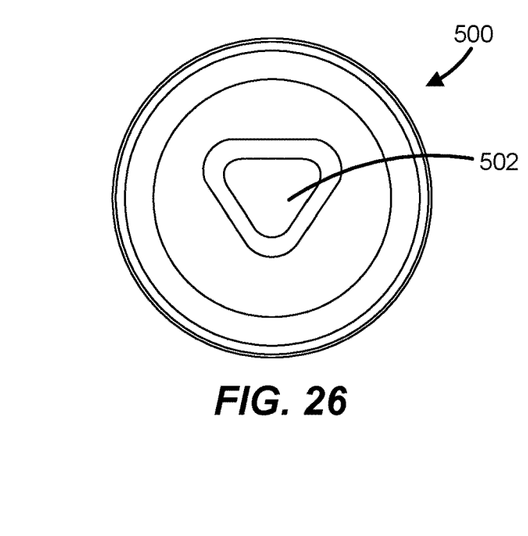
FIG. 26 is an end schematic view of the end effector of FIG. 24.

Referring now to FIGS. 24-26, a further embodiment of an end effector 500 that can be mounted to a robotic arm of a system in accordance with the present disclosure and used to pick and place three-dimensional physical objects having three-dimensional gripping features that are structurally complementary to the end effector 500 is schematically depicted. The end effector 500 includes a gripping finger 502 having a tapered portion 504. The gripping finger 502 can be inserted into a cavity of a three-dimensional gripping feature 465 of a physical object. In some examples, the gripping finger 502 is sized such that once it has been inserted into the gripping feature cavity beyond the tapered portion 504, an interference fit between the gripping feature and the finger 502 is established. In some examples, the interference fit is insufficiently strong to hold the object against the force of gravity. Therefore, the end effector 500 can include a suction component including a nozzle 506 in communication with a vacuum device (not shown). The nozzle can include a flexible accordion-like resiliently collapsible and expandable sleeve 510 to provide a flexible interfacing with an object to be picked. An interfacing portion 508 of the nozzle 506 is adapted to abut a surface of the object to be picked, the surface surrounding the cavity of the three-dimensional gripping feature. When a suction force is applied, the interfacing portion 508 grips an object to be picked. In some examples, the combination of the suction force and the interference fit of the finger and cavity is sufficient to pick a given physical object, and the physical object can be released by, e.g., reducing or terminating the suction force.

Figure 27:
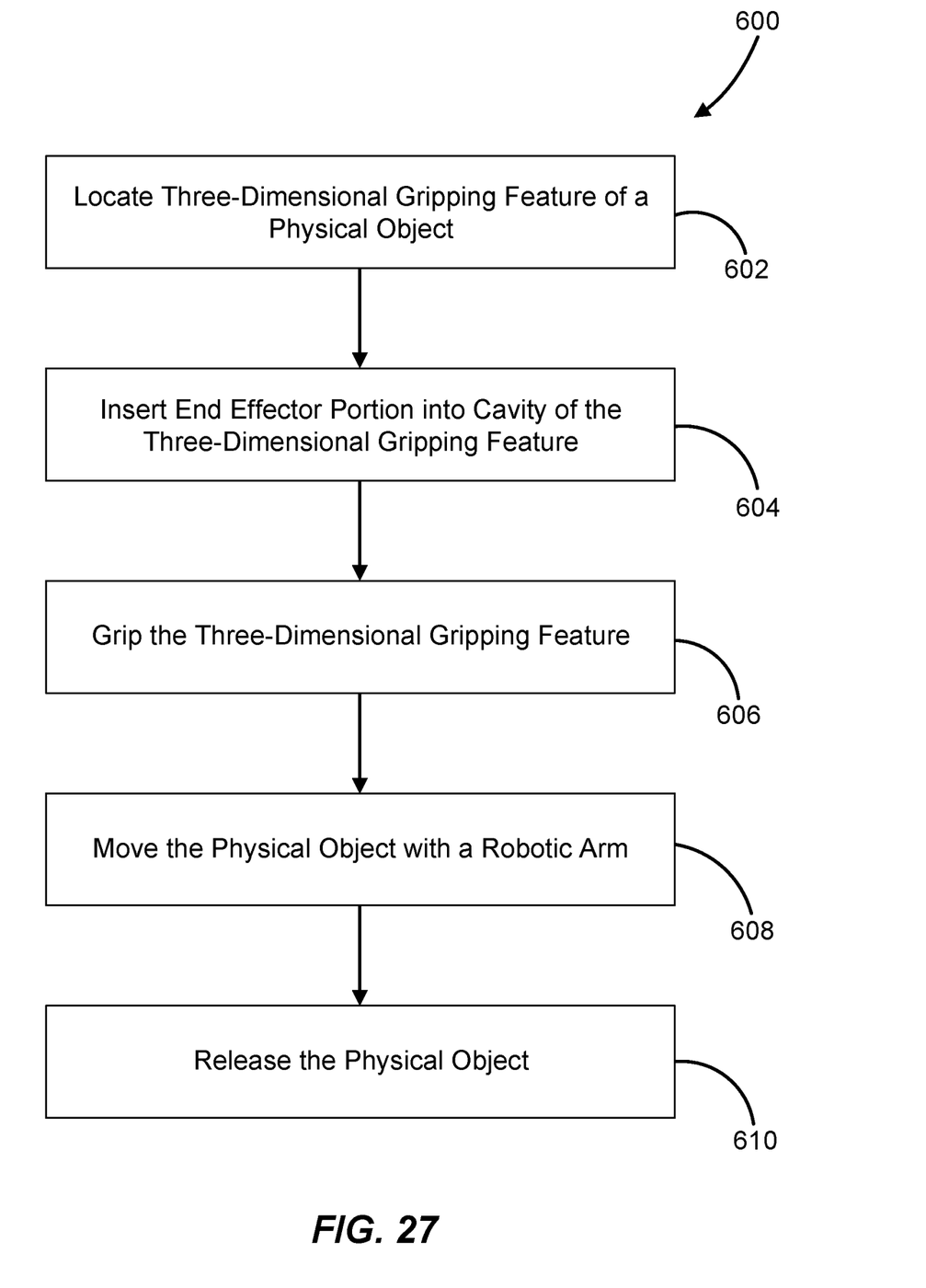
FIG. 27 is an example process flow in accordance with the present disclosure.

Referring now to FIG. 27, an example method 600 of using a robotic manipulation system, such as the system 10 of FIG. 1, is represented. In a step 602 of the method 600 a three-dimensional gripping feature of a physical object in a three-dimensional reference space is located, e.g., using an optics system. In a step 604, a portion of an end effector of a robot is inserted into a cavity of the three-dimensional gripping feature (or otherwise grips a three-dimensional gripping feature, e.g., by a grasping a protrusion of the three-dimensional gripping feature). In a step 606, the end effector is actuated to grip the three-dimensional gripping feature. In a step 608 the gripped physical object is moved by the robot, e.g., with a robotic arm of the robot. In a further step 610, the end effector is actuated again such that the physical object is released by the end effector and thereby placed in a desired location.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:
1. A robotic manipulation system, comprising:
a first physical object and a second physical object having different sizes and/or different shapes and including three-dimensional gripping features of identical construction, each gripping feature including a cavity defined by an interior surface of a corresponding one of the physical objects, the cavity being a tubular, conical, or frusto-conical blind cavity recessed from an exterior surface of the corresponding physical object, the cavity being open on one side of the cavity only;
a robotic arm, the robotic arm including:
an end effector configured to selectively grip each three-dimensional gripping feature when the corresponding physical object is positioned in a three-dimensional reference space; and
a plurality of actuators configured to cause the end effector to translate and rotate within the three-dimensional reference space;
an optics system configured to locate the three-dimensional gripping feature relative to the three-dimensional reference space and provide position output of the three-dimensional gripping feature; and
a controller configured to, based on the position output, control the actuators to:

i) move the end effector such that the end effector is aligned with each three-dimensional gripping feature; and ii) insert the end effector into the cavity through the one side to grip each three-dimensional gripping feature with the end effector.

2. The system of claim 1, wherein the robotic arm is configured such that the end effector grips each three-dimensional gripping feature with sufficient gripping force to move the corresponding physical object with the end effector.

3. The system of claim 1, wherein the robotic arm includes a gripping actuator configured to cause the end effector to grip each three-dimensional gripping feature.

4. The system of claim 3,
wherein the end effector includes a plurality of fingers; and
wherein the gripping actuator is configured to move the plurality of fingers relative to each other within each gripping feature.

5. The system of claim 1, wherein each three-dimensional gripping feature includes at least three cavities.

6. The system of claim 1, wherein each cavity is tubular.

7. The system of claim 1, wherein each physical object includes one or more orientation indicia, and wherein the optics system is configured to detect the one or more orientation indicia and, based on a location and/or orientation of the one or more orientation indicia relative to the three-dimensional gripping feature of the corresponding physical object, determine a rotational orientation of the three-dimensional gripping feature relative to the three-dimensional reference space.

8. The system of claim 1, wherein the end effector comprises a suction member, and wherein the system includes a vacuum generator configured to generate a suction force at the suction member.

9. The system of claim 1, wherein the physical objects have different weights.

* * * * *